(12) United States Patent
Jeong

(10) Patent No.: US 11,822,483 B2
(45) Date of Patent: Nov. 21, 2023

(54) OPERATING METHOD OF MEMORY SYSTEM INCLUDING CACHE MEMORY FOR SUPPORTING VARIOUS CHUNK SIZES

(71) Applicant: SK hynix Inc., Gyeonggi-do (KR)

(72) Inventor: Seung-Gyu Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/881,810

(22) Filed: Aug. 5, 2022

(65) Prior Publication Data

US 2022/0374364 A1 Nov. 24, 2022

Related U.S. Application Data

(62) Division of application No. 16/721,391, filed on Dec. 19, 2019, now Pat. No. 11,442,869.

(30) Foreign Application Priority Data

Mar. 22, 2019 (KR) .......................... 10-2019-0032906

(51) Int. Cl.
*G06F 12/0893* (2016.01)
*G06F 12/12* (2016.01)

(52) U.S. Cl.
CPC .......... *G06F 12/0893* (2013.01); *G06F 12/12* (2013.01); *G06F 2212/608* (2013.01)

(58) Field of Classification Search
CPC . G06F 12/0893; G06F 12/12; G06F 2212/608
See application file for complete search history.

(56) References Cited

U.S. PATENT DOCUMENTS

| 6,148,394 | A | 11/2000 | Tung et al. | |
|---|---|---|---|---|
| 2008/0109606 | A1* | 5/2008 | Lataille | G06F 12/12 711/E12.051 |
| 2009/0013132 | A1* | 1/2009 | Kurd | G06F 12/0886 711/125 |
| 2010/0268887 | A1* | 10/2010 | Ghai | G06F 12/0811 711/E12.017 |
| 2013/0073812 | A1 | 3/2013 | Kanai et al. | |
| 2015/0058574 | A1* | 2/2015 | Meredith | G06F 9/461 711/125 |
| 2015/0100733 | A1 | 4/2015 | Basto et al. | |

(Continued)

FOREIGN PATENT DOCUMENTS

CN 106909516 A 6/2017

OTHER PUBLICATIONS

Office Action for the U.S. Appl. No. 17/881,196 issued by the USPTO dated Feb. 24, 2023.

(Continued)

*Primary Examiner* — Gurtej Bansal
(74) *Attorney, Agent, or Firm* — IP & T GROUP LLP

(57) ABSTRACT

A cache memory includes a first cache area corresponding to even addresses, and a second cache area corresponding to odd addresses, wherein each of the first and second cache areas includes a plurality of cache sets, and each cache set includes a data set field suitable for storing data corresponding to an address among the even and odd addresses, and a pair field suitable for storing information on a location where data corresponding to an adjacent address which is adjacent to an address corresponding to the stored data is stored.

8 Claims, 5 Drawing Sheets

111

| EVEN CACHE AREA | | ODD CACHE AREA | |
|---|---|---|---|
| INDEX | CACHE SET | INDEX | CACHE SET |
| 30 | EVEN63 | 31 | ODD63 |
| | EVEN62 | | ODD62 |
| | EVEN61 | | ODD61 |
| | EVEN60 | | ODD60 |
| ⋮ | ⋮ | ⋮ | ⋮ |
| 2 | EVEN7 | 3 | ODD7 |
| | EVEN6 | | ODD6 |
| | EVEN5 | | ODD5 |
| | EVEN4 | | ODD4 |
| 0 | EVEN3 | 1 | ODD3 |
| | EVEN2 | | ODD2 |
| | EVEN1 | | ODD1 |
| | EVEN0 | | ODD0 |

(56) References Cited

U.S. PATENT DOCUMENTS

2017/0123991 A1* 5/2017 Sela .................... G06F 12/0246
2018/0165217 A1 6/2018 Greenspan

OTHER PUBLICATIONS

First Office Action on the Chinese Patent Application No. 201911265732.2 issued by the Chinese Patent Office dated Aug. 31, 2023.

* cited by examiner

| EVEN CACHE AREA | | ODD CACHE AREA | |
|---|---|---|---|
| INDEX | CACHE SET | INDEX | CACHE SET |
| 30 | EVEN63 | 31 | ODD63 |
| | EVEN62 | | ODD62 |
| | EVEN61 | | ODD61 |
| | EVEN60 | | ODD60 |
| ⋮ | ⋮ | ⋮ | ⋮ |
| 2 | EVEN7 | 3 | ODD7 |
| | EVEN6 | | ODD6 |
| | EVEN5 | | ODD5 |
| | EVEN4 | | ODD4 |
| 0 | EVEN3 | 1 | ODD3 |
| | EVEN2 | | ODD2 |
| | EVEN1 | | ODD1 |
| | EVEN0 | | ODD0 |

OPERATING METHOD OF MEMORY SYSTEM INCLUDING CACHE MEMORY FOR SUPPORTING VARIOUS CHUNK SIZES

CROSS-REFERENCE TO RELATED APPLICATION

This application is a divisional application of U.S. patent application Ser. No. 16/721,391 filed on Dec. 19, 2019, which claims priority under 35 U.S.C. § 119 to Korean Patent Application No. 10-2019-0032906 filed on Mar. 22, 2019, which is incorporated herein by reference in its entirety.

BACKGROUND

1. Field

The present disclosure generally relates to a memory system including a cache memory.

2. Discussion of the Related Art

Recently, research is being actively performed on next-generation memories such as a resistive random-access memory (RRAM), a phase-change random-access memory (PCRAM), a magnetic random-access memory (MRAM) and a ferroelectric random-access memory (FRAM). However, the operating speeds of the next-generation memories do not achieve a desired speed, and the defect rates of the next-generation memories do not achieve a desired level. Furthermore, the next-generation memories have a problem with endurance. Therefore, when the next-generation memories are accessed a number of times, the lifetimes of the next-generation memories are rapidly reduced. A cache memory is proposed to support the operating speeds of the next-generation memories and to reduce the number of accesses.

Also, next-generation memories should be able to operate with various types of hosts. Each of the hosts may have a different data chunk size. To allow communication between the host and the memory when the data chunk size of a host is different from the data chunk size of a memory, a cache memory is proposed.

SUMMARY

Various embodiments of the present invention are directed to an improved structure and functionality cache memory for a memory system.

The cache memory may be used for communication between a host and a memory device of a memory system which have different data chunk sizes.

The cache memory may improve the operating speed of a memory system employing the cache memory.

The cache memory may reduce the number of times a memory device of a memory system is accessed.

In an embodiment, a cache memory includes: a first cache area corresponding to even addresses; and a second cache area corresponding to odd addresses, wherein each of the first and second cache areas includes a plurality of cache sets, and each cache set comprises: a data set field suitable for storing data corresponding to an address among the even and odd addresses; and a pair field suitable for storing information on a location where data corresponding to an adjacent address which is adjacent to an address corresponding to the stored data is stored.

In an embodiment, a memory system includes: a first cache area including a plurality of first cache sets and suitable for storing first data corresponding to even addresses; a second cache area including a plurality of second cache sets and suitable for storing second data corresponding to odd addresses; a check circuit suitable for checking a hit or miss of input data for each of the first and second cache sets; a detection circuit suitable for detecting whether the input data is the first data or the second data; and a control circuit suitable for allocating the input data to one of the plurality of first and second cache sets, according to the check and detection results.

In an embodiment, an operating method of a memory system which includes a cache memory including first and second cache areas, between a host and a memory which have different data chunk sizes, each of the first and second cache areas including a plurality of cache sets, the operating method including: checking a hit or a miss of the first cache area, based on an input address; storing input data in a third cache set of the first cache area, when the third cache set is checked as a hit and the input data corresponds to the first cache area; and generating location information of the third cache set when the third cache set is checked as the hit and the input data corresponds to the second cache area.

In an embodiment, a memory system includes: a host suitable for providing multiple chunks of host data and host addresses, the host addresses including even addresses and odd addresses, each chunk of the host data having a first size; a memory device suitable for storing multiple chunks of memory data, each chunk of the memory data having a second size greater than the first size; and a controller including a cache memory which includes a first cache area corresponding to the even addresses, and a second cache area corresponding to the odd addresses, each of the first and second cache areas including a plurality of even and odd cache sets, respectively, wherein a first cache set of the first cache area includes: a first field suitable for storing a first chunk of the host data corresponding to a first address among the host addresses; and a second field suitable for storing information on a second cache set in which a second chunk of the host data is stored, the second chunk corresponding to a second address among the host addresses, which is adjacent to the first address, wherein the first cache set corresponds to an even address of the even addresses, and the second cache set corresponds to an odd address of the odd addresses.

These and other features and advantages of the present invention will become apparent to those skilled in the art of the invention from the following detailed description in conjunction with the following drawings.

BRIEF DESCRIPTION OF THE DRAWINGS

FIG. 2 is a diagram illustrating a cache memory of FIG. 1.

DETAILED DESCRIPTION

Various embodiments of the present invention will be described in greater detail with reference to the accompanying drawings. Although a few embodiments of the present invention will be shown and described, it will be appreciated by those of ordinary skill in the art that changes may be made in these embodiments without departing from the principles and spirit of the present invention.

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

Figure 1:
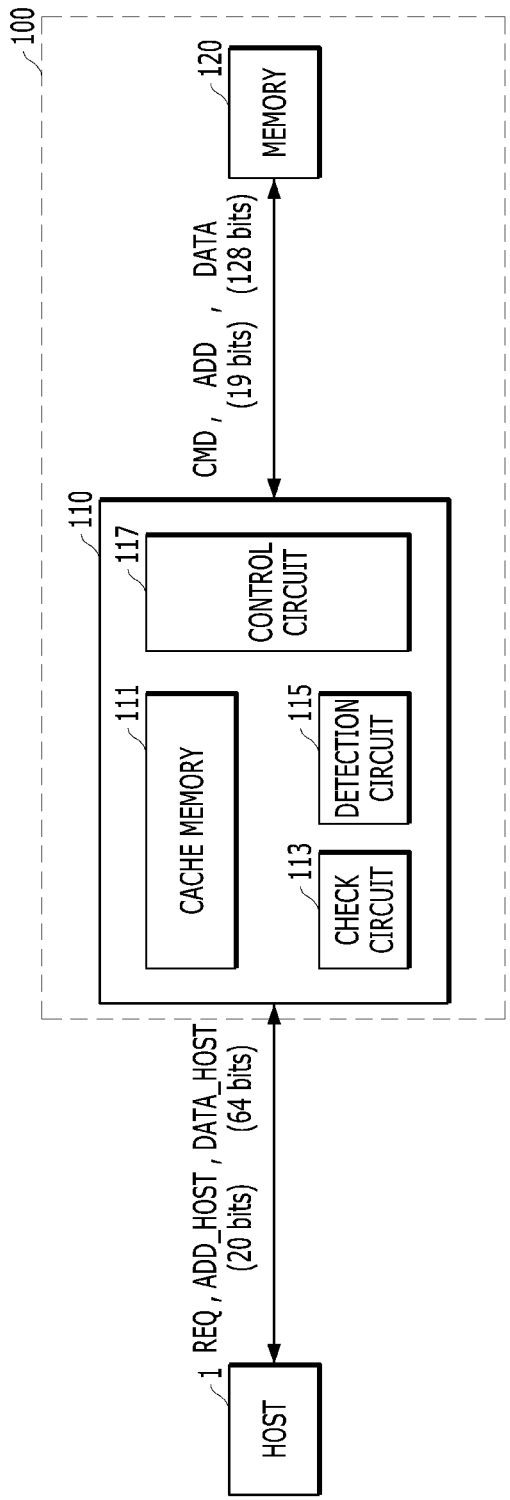
FIG. 1 is a block diagram illustrating a memory system in accordance with an embodiment.

FIG. 1 is a block diagram illustrating a memory system 100 in accordance with an embodiment.

Referring to FIG. 1, the memory system 100 may include a memory controller 110 and a memory 120. The memory system 100 may operate with a host 1.

The host 1 may send a request REQ to the memory controller 110 to request a read and/or write (read/write) operation of the memory 120. When requesting the read/write operation, the host 1 may transfer an address ADD_HOST to the memory controller 110. The address ADD_HOST may designate a location where the read/write operation is to be performed. The host 1 may transfer write data DATA_HOST to the memory controller 110 when requesting the write operation. Further, the host 1 may receive read data DATA_HOST from the memory controller 110 after requesting the read operation. The address and data which are transferred between the host 1 and the memory controller 110 may be represented by ADD_HOST and DATA_HOST, respectively, so as to be distinguished from an address ADD and data DATA which are transferred between the memory controller 110 and the memory 120.

In an embodiment, the address ADD_HOST has 20 bits. Furthermore, a size of data (i.e., data chunk size) of the host 1 is 64 bits. That is, the size of data DATA_HOST, which is processed at a time in response to a read and/or write request is 64 bits. However, the present embodiment is not limited thereto.

The memory 120 may perform a read and/or write operation under control of the memory controller 110. The memory 120 may receive a command CMD and an address ADD from the memory controller 110, and transfer and receive data DATA to and from the memory controller 110. The command CMD may be used to indicate an operation to be performed by the memory 120. The address ADD may be used to designate an area to be accessed in the memory 120. During the write operation, the data DATA may be transferred from the memory controller 110 to the memory 120. During the read operation, the data DATA may be transferred from the memory 120 to the memory controller 110.

Although not illustrated in FIG. 1, the memory controller 110 may perform an error correction code (ECC) operation to detect an error which occurs in the data DATA. For this operation, the memory controller 110 may process data DATA having a different chunk size from the data DATA_HOST requested by the host 1. That is, the data chunk size between the memory controller 110 and the memory 120 may be N times larger than the data chunk size between the host 1 and the memory controller 110, where N is an integer greater than or equal to 2. Here, N may be set to 2, which means that the size of the data DATA processed at a time during the read/write operation is 128 bits.

Since the data chunk size of the memory 120 is twice greater than the data chunk size of the host 1, the number of areas to be addressed may be halved. Therefore, the number of bits in the address ADD used by the memory 120 may be less by one bit than the number of bits in the address ADD_HOST of the host 1. That is, the address ADD used by the memory 120 may have 19 bits. The memory 120 may be one of various types of memories such as a dynamic random-access memory (DRAM), NAND flash, resistive random-access memory (RRAM), phase-change random-access memory (PCRAM), magnetic random-access memory (MRAM), and ferroelectric random-access memory (FRAM).

The memory controller 110 may control the memory 120 according to a request of the host 1. The memory controller 110 may include a cache memory 111, a check circuit 113, a detection circuit 115 and a control circuit 117.

The cache memory 111 may serve as a cache in communication between the host 1 and the memory 120. The cache memory 111 may operate at higher speed than the memory 120, and have a smaller storage capacity than the memory 120. Since the host 1 has a different data chunk size from the memory 120, the cache memory 111 may have a structure for supporting the data chunk size.

When the data chunk size of the host 1 is 64 bits and the data chunk size of the memory 120 is 128 bits, the cache memory 111 may include a plurality of first cache sets and a plurality of second cache sets. The plurality of first cache sets may store data corresponding to an even-bit address (also referred to herein simply as an even address) among the addresses ADD_HOST. The plurality of second cache sets may store data corresponding to an odd-bit address (also referred to herein simply as an odd address) among the addresses ADD_HOST. The structure of the cache memory 111 will be described in detail with reference to FIGS. 2 and 3.

The check circuit 113 may check a hit or miss of the cache memory 111 when the host 1 requests a read/write operation. In case of a cache hit, the memory 120 may not be accessed, but the cache memory 111 operating at high speed may be accessed. Thus, a request for the read/write operation of the host may be rapidly processed. In case of a cache miss, the memory 120 needs to be accessed. Thus, the request for the read/write operation of the host 1 may be processed at lower speed than in case of the cache hit. In an embodiment, the check circuit 113 may check a hit or miss of the data DATA_HOST for each of the first and second cache sets of the cache memory 111.

The detection circuit 115 may detect whether the data DATA_HOST requested from the host 1 is data corresponding to an even-bit address or odd-bit address. For this operation, the detection circuit 115 may check the least significant bit (LSB) of the address ADD_HOST. For example, when the data chunk size is 64 bits, the first to sixth bits of the address ADD_HOST may be ignored because the first to sixth bits correspond to the data DATA_HOST processed at a time. That is, the detection circuit 115 may check the seventh bit of the address ADD_HOST as the LSB.

When the LSB of the address ADD_HOST corresponds to an even number (i.e., a value of '0' the detection circuit 115 may detect the data DATA_HOST as data corresponding to an even-bit address, and the control circuit 117 may store the data DATA_HOST in the first cache sets. When the LSB of the address ADD_HOST corresponds to an odd number (i.e., a value of '1'), the detection circuit 115 may detect the data DATA_HOST as data corresponding to an odd-bit address, and the control circuit 117 may store the data DATA_HOST in the second cache sets.

According to the hit/miss check result of the check circuit 113, the control circuit 117 may allocate the data DATA_HOST to one of the first and second cache sets. That is, according to the check and detection results of the check circuit 113 and the detection circuit 115, the control circuit 117 may allocate the data DATA_HOST to one of the first and second cache sets of the cache memory 111.

In an embodiment, the control circuit 117 may generate location information for a cache set in which data corresponding to an address adjacent to the address ADD_HOST corresponding to the data DATA_HOST is stored, among the plurality of first and second cache sets of the cache memory 111. The control circuit 117 may store the generated location information and the data DATA_HOST in the allocated cache set. Based on the location information stored in the plurality of first and second cache sets of the cache memory 111, the control circuit 117 may evict data corresponding to addresses adjacent to each other together, among the data stored in the plurality of first and second cache sets.

FIG. 2 is a diagram illustrating the cache memory 111 of FIG. 1.

Referring to FIG. 2, the cache memory 111 may include a plurality of cache sets CACHE SET. By way of example, the cache memory 111 includes 128 cache sets CACHE SET. The 128 cache sets CACHE SET may be classified into 32 indexes INDEX. That is, four cache sets CACHE SET may correspond to one index INDEX.

As such, four cache sets CACHE SET of the cache memory 111 share one index value, the structure of the cache memory 111 may be referred to as a 4-way set-associative structure. If the indexes INDEX are not considered, the structure may become a fully-associative structure. The number of cache sets CACHE SET sharing an index value may be greater than or equal to four. The present embodiment is not limited thereto, but the cache memory 111 may have various structures depending on embodiments.

In general, the address ADD_HOST includes a plurality of bits. Some low-order bits among the plurality of bits may be used as an index INDEX for addressing cache sets CACHE SET. The other bits among the plurality of bits may be stored as tag information in the cache sets CACHE SET. According to a comparison result between the address ADD_HOST and the index INDEX and the tag TAG, a cache hit/miss of the data DATA_HOST may be checked. This process will be described in more detail with reference to FIG. 4.

The cache memory 111 may be divided into an even cache area EVEN CACHE AREA and an odd cache area ODD CACHE AREA. The even cache area EVEN CACHE AREA may include a plurality of first cache sets EVEN0 to EVEN63. The odd cache area ODD CACHE AREA may include a plurality of second cache sets ODD0 to ODD63. The plurality of first cache sets EVEN0 to EVEN63 may store first data corresponding to an even-bit address. The plurality of second cache sets ODD0 to ODD63 may store second data corresponding to an odd-bit address.

As described above, the address ADD_HOST may be classified into an even-bit address or odd-bit address, according to the LSB of the address ADD_HOST. That is, the LSB of the address ADD_HOST may determine whether to allocate the data DATA_HOST to the plurality of first cache sets EVEN0 to EVEN63 or the plurality of second cache sets ODD0 to ODD63. Therefore, the other low-order bits of the some low-order bits of the address ADD_HOST except the LSB may be classified into the index INDEX.

When the first and second cache sets EVEN0 to EVEN63 and ODD0 to ODD63 are classified into 32 indexes, five low-order bits of the address ADD_HOST may be used for addressing. At this time, the other second to fifth low-order bits of the five low-order bits of the address ADD_HOST except the LSB may be classified into the index INDEX. That is, indexes '0' and '1' may correspond to the same value in which the second to fifth low-order bits of the address ADD_HOST are '0000'. Therefore, when the address ADD_HOST in which the second to fifth low-order bits are '0000' is inputted, the check circuit 113 may access not only the first cache sets EVEN0 to EVEN3 but also the second cache sets ODD0 to ODD3. The detection circuit 115 may check the LSB of the address ADD_HOST, such that the data DATA_HOST is allocated to one of the first cache sets EVEN0 to EVEN3 and the second cache sets ODD0 to ODD3.

Figure 3:
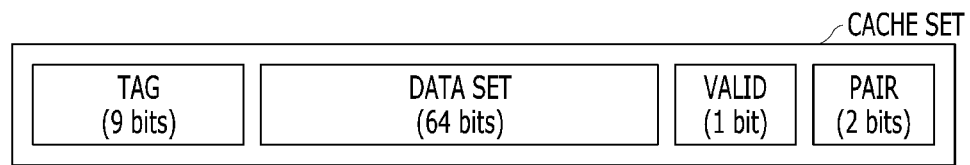
FIG. 3 is a diagram illustrating a cache set in accordance with an embodiment.

FIG. 3 is a diagram illustrating a cache set CACHE SET. Each of the first and second cache sets EVEN0 to EVEN63 and ODD0 to ODD63 of FIG. 2 may be configured as illustrated in FIG. 3.

Referring to FIG. 3, the cache set CACHE SET may include a field for a tag TAG, a field for a data set DATA SET, a valid field for a valid bit VALID and a pair field for pair bits PAIR.

The tag TAG may indicate information corresponding to the other bits of the address ADD_HOST except the LSB and the low-order bits corresponding to the index INDEX. For example, when the data chunk size is 64 bits, the first to sixth bits of the address ADD_HOST may be ignored because the first to sixth bits correspond to the data DATA_HOST processed at a time. In the embodiment of FIG. 2, the 7th to 11th bits of the address ADD_HOST may correspond to the LSB and the index INDEX. Thus, the tag TAG may correspond to the other high-order bits of the address ADD_HOST from the 12th bit. When the address ADD_HOST is composed of 20 bits, the tag TAG may include 9-bit information.

The data DATA_HOST requested by the host 1 may be stored in the data set DATA SET. The data set DATA SET may store data having the same size as the data chunk size of the host 1, for example, 64-bit data.

The valid bit VALID may include a flag bit indicating whether the data has been updated from the memory 120 into the corresponding cache set or not. When the flag bit is activated and thus the valid bit VALID is stored as a value of '1', it may indicate that the data has been updated from the memory 120 into the corresponding cache set. When the flag bit is deactivated and thus the valid bit VALID is stored as a value of '0', it may indicate that the data has never been updated from the memory 120 into the corresponding cache set. That is, the valid bit VALID may include valid information of the corresponding cache set.

The pair bits PAIR may indicate information on the location where data corresponding to an address adjacent to the address ADD_HOST corresponding to the data DATA_HOST stored in the data set DATA SET is stored. Based on the location information stored in the pair bits PAIR, the data adjacent to the data DATA_HOST stored in the data set DATA SET may be evicted together. The pair bits PAIR may be configured as two bits to indicate the location information of four cache sets CACHE SET included in one index INDEX. However, depending on the configuration of the cache memory 111, the pair bits PAIR may be configured as various numbers of bits.

Figure 4:
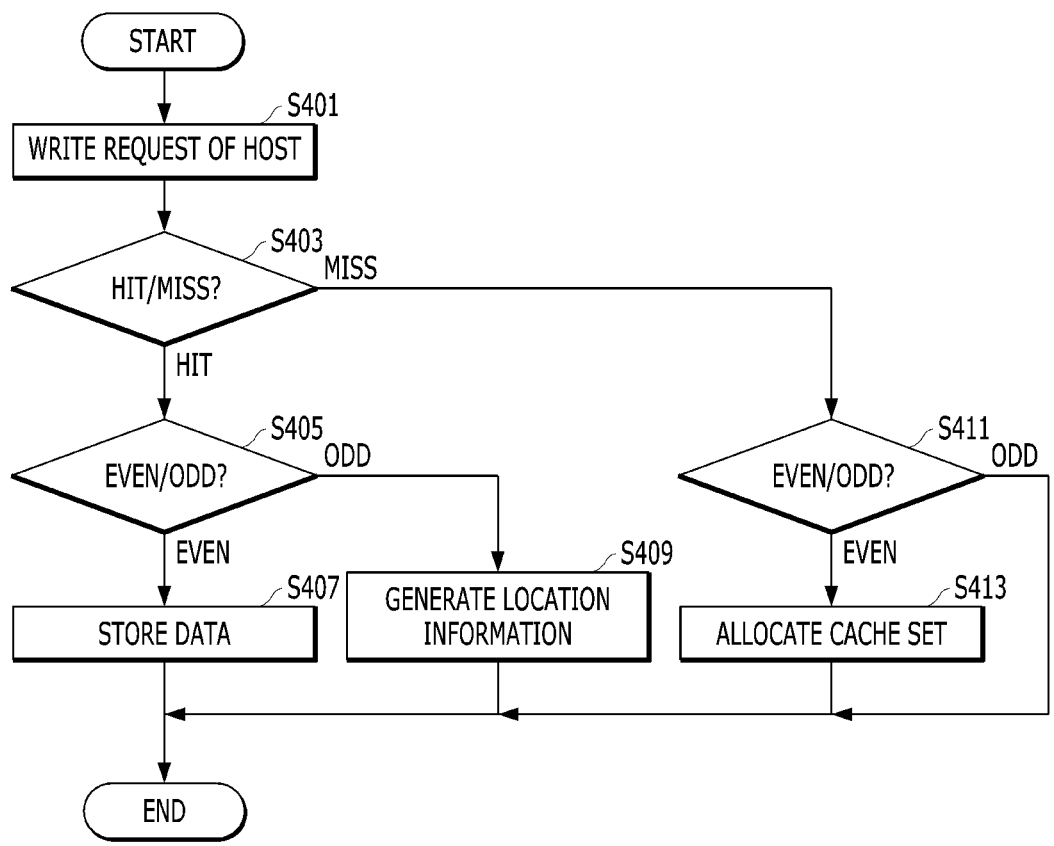
FIGS. 4 and 5 are flowcharts illustrating operations of a memory system in accordance with an embodiment.
Figure 5:
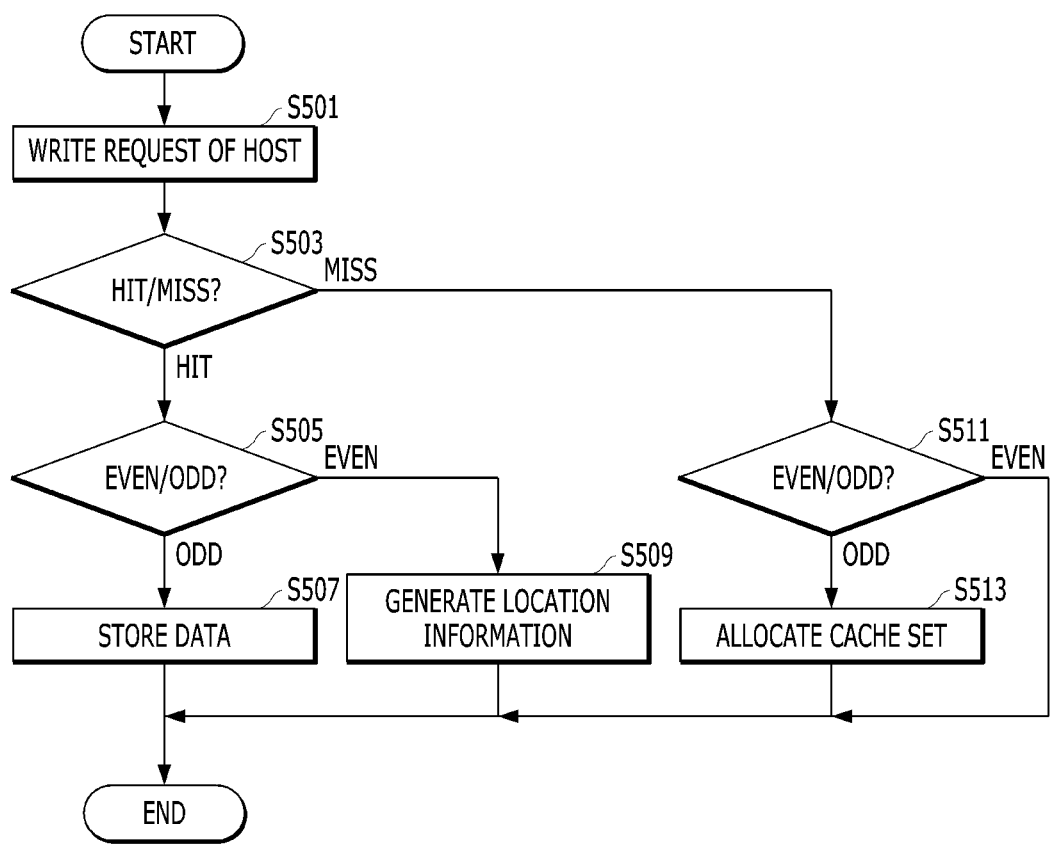

FIGS. 4 and 5 are flowcharts illustrating operations of the memory system 100 in accordance with an embodiment.

A write operation of the memory system 100 may be started as the host 1 transfers a request REQ for the write operation, an address ADD_HOST, and data DATA_HOST to the memory controller 110. In response, the memory controller 110 may check a hit or miss of the data DATA_HOST inputted to each of the even cache area EVEN CACHE AREA and the odd cache area ODD CACHE AREA of the cache memory 111.

FIG. 4 illustrates an operation in which the memory controller 110 checks a hit or miss of the data DATA_HOST for the even cache area EVEN CACHE AREA of the cache memory 111. That is, when a write operation is requested by the host 1 in step S401, the check circuit 113 may check hits or misses of the first cache sets EVEN0 to EVEN63 of the cache memory 111, based on the input address ADD_HOST, in step S403. The check circuit 113 may compare the other low-order bits among the low-order bits of the address ADD_HOST, except the LSB, with the indexes INDEX of the first cache sets EVEN0 to EVEN63.

When the second to fifth low-order bits of the address ADD_HOST coincide with the index INDEX of '0' (that is, '0000'), the check circuit 113 may access the four first cache sets EVEN0 to EVEN3 corresponding to the index INDEX of '0'. The check circuit 113 may compare the other bits of the address ADD_HOST, except the LSB and the low-order bits corresponding to the index INDEX, with the tags TAG of the four first cache sets EVEN0 to EVEN3. When the comparison result indicates that a third cache set of the four first cache sets EVEN0 to EVEN3 has a tag value coinciding with the other bits of the address ADD_HOST, the check circuit 113 may check the third cache set as a hit (HIT in step S403). When the comparison result indicates that there is no cache set having a tag value coinciding with the other bits of the address ADD_HOST among the four first cache sets EVEN0 to EVEN3, the check circuit 113 may check the four first cache sets EVEN0 to EVEN3 as misses (MISS in step S403).

The detection circuit 115 may detect whether the data DATA_HOST is even data or odd data, based on the address ADD_HOST, in step S405 and S411. When the LSB of the address ADD_HOST corresponds to an even number, the detection circuit 115 may detect the data DATA_HOST as even data, and the data DATA_HOST may correspond to the first cache sets EVEN0 to EVEN63. When the LSB of the address ADD_HOST corresponds to an odd number, the detection circuit 115 may detect the data DATA_HOST as odd data, and the data DATA_HOST may correspond to the second cache sets ODD0 to ODD63.

When the third cache set of the plurality of first cache sets EVEN0 to EVEN63 is checked as a hit (HIT in step S403) and the data DATA_HOST corresponds to the first cache sets EVEN0 to EVEN63 (EVEN in step S405), the control circuit 117 may store the data DATA_HOST in the third cache set in step S407. When the third cache set of the plurality of first cache sets EVEN0 to EVEN63 is checked as a hit (HIT in step S403) and the data DATA_HOST corresponds to the second cache sets ODD0 to ODD63 (ODD in step S405), the control circuit 117 may generate the location information of the third cache set in step S409.

When the four first cache sets EVEN0 to EVEN3 corresponding to the other low-order bits of the address ADD_HOST among the plurality of first cache sets EVEN0 to EVEN63 are checked as misses (MISS in step S403) and the data DATA_HOST corresponds to the first cache sets EVEN0 to EVEN63 (EVEN in step S411), the control circuit 117 may allocate the data DATA_HOST to the four first cache sets EVEN0 to EVEN3 in step S413. Based on the valid information of the four first cache sets EVEN0 to EVEN3, i.e., the valid bit VALID, the control circuit 117 may check a valid or empty first cache set among the four first cache sets EVEN0 to EVEN3. The control circuit 117 may store the data DATA_HOST in the valid first cache set.

FIG. 5 illustrates an operation in which the memory controller 110 checks a hit or miss of the data DATA_HOST for the odd cache area ODD CACHE AREA of the cache memory 111. In FIGS. 4 and 5, the detailed operation of the memory controller 110 to check a hit or miss of the data DATA_HOST may be performed in a similar manner. Thus, the duplicated descriptions thereof will be omitted herein.

When a write operation is requested by the host 1 in step S501, the check circuit 113 may check hits or misses of the second cache sets ODD0 to ODD63 of the cache memory 111, based on the input address ADD_HOST, in step S503. The check circuit 113 may compare the other low-order bits of the low-order bits of the address ADD_HOST except the LSB with the indexes INDEX of the second cache sets ODD0 to ODD63.

As in the aforementioned example, when the second to fifth low-order bits of the address ADD_HOST coincide with the index INDEX of '1' (that is, '0000'), the check circuit 113 may access the four second cache sets ODD0 to ODD3 corresponding to the index INDEX of '1'. The check circuit 113 may compare the other bits of the address ADD_HOST, except the LSB and the low-order bits corresponding to the index INDEX, with the tags TAG of the four second cache sets ODD0 to ODD3. When the comparison result indicates that a fourth cache set of the four second cache sets ODD0 to ODD3 has a tag value coinciding with the other bits of the address ADD_HOST, the check circuit 113 may check the fourth cache set as a hit (HIT in step S503). When the comparison result indicates that there is no cache set having a tag value coinciding with the other bits of the address ADD_HOST among the four second cache sets ODD0 to ODD3, the check circuit 113 may check the four second cache sets ODD0 to ODD3 as misses (MISS in step S503).

Similarly, the detection circuit 115 may detect whether the data DATA_HOST is even data or odd data, based on the address ADD_HOST, in step S505 and S511. When the fourth cache set of the plurality of second cache sets ODD0 to ODD63 is checked as a hit (HIT in step S503) and the data DATA_HOST corresponds to the second cache sets ODD0 to ODD63 (ODD in step S505), the control circuit 117 may store the data DATA_HOST in the fourth cache set in step S507. When the fourth cache set of the plurality of second cache sets ODD0 to ODD63 is checked as a hit (HIT in step S503) and the data DATA_HOST corresponds to the first cache sets EVEN0 to EVEN63 (EVEN in step S505), the control circuit 117 may generate the location information of the fourth cache set in step S509. When the four second cache sets ODD0 to ODD3 corresponding to the other low-order bits of the address ADD_HOST among the plurality of second cache sets ODD0 to ODD63 are checked as misses (MISS in step S503) and the data DATA_HOST corresponds to the second cache sets ODD0 to ODD63 (ODD in step S511), the control circuit 117 may allocate the data DATA_HOST to the four second cache sets ODD0 to ODD3 in step S513.

Referring back to FIG. 4, when the third cache set of the plurality of first cache sets EVEN0 to EVEN63 is checked as a hit (HIT in step S403) and the data DATA_HOST corresponds to the first cache sets EVEN0 to EVEN63 (EVEN in step S405), the control circuit 117 may store the data DATA_HOST in the third cache set in step S407. At this time, when the fourth cache set checked as a hit occurs among the plurality of second cache sets ODD0 to ODD63

(HIT in step S503), the data DATA_HOST may correspond to the first cache sets EVEN0 to EVEN63 (EVEN in step S505). Thus, the control circuit 117 may generate the location information of the fourth cache set in step S509.

Therefore, the control circuit 117 may store the location information of the fourth cache set while storing the data DATA_HOST in the third cache set. The control circuit 117 may store the location information of the fourth cache set in the pair bits PAIR of the third cache set, while storing the data DATA_HOST in the data set DATA SET of the third cache set. That is, the control circuit 117 may check a hit/miss of data corresponding to an adjacent address as well as the data DATA_HOST, and store the location information of data corresponding to the adjacent address with the data DATA_HOST according to the check result. In an embodiment, when evicting the data stored in the data set DATA SET of the third cache set, the control circuit 117 may evict the data of the fourth cache set together, based on the location information stored in the pair bits PAIR of the third cache set.

When the control circuit 117 allocates the data DATA_HOST to the first cache sets EVEN0 to EVEN3 in step S413, the data of the first cache sets EVEN0 to EVEN3 may be evicted when a valid first cache set is not checked. The control circuit 117 may check the pair information of the first cache sets EVEN0 to EVEN3, i.e., the pair bits PAIR. Based on the pair information, the control circuit 117 may check a first cache set paired with the second cache sets ODD0 to ODD63, among the first cache sets EVEN0 to EVEN3. The control circuit 117 may check a first cache set including location information in the pair bits PAIR, among the first cache sets EVEN0 to EVEN3, as the first cache set paired with the second cache sets ODD0 to ODD63.

That is, the first cache set including the location information in the pair bits PAIR and the second cache set corresponding to the location information may be paired as cache sets for storing the data corresponding to the adjacent address. The control circuit 117 may evict the data of the first and second cache sets paired with each other together. The control circuit 117 may store the data DATA_HOST in the first cache set from which the data has been evicted.

Similarly, when the data DATA_HOST is stored in the valid first cache set or the first cache set from which the data has been evicted, the fourth cache set of the plurality of second cache sets ODD0 to ODD63 may be checked as a hit, and location information may be generated. In this case, the control circuit 117 may store the data DATA_HOST and the location information of the fourth cache set in the valid first cache set or the first cache set from which the data has been evicted. The control circuit 117 may store the location information of the fourth cache set in the pair bits PAIR of the valid first cache set or the first cache set from which the data has been evicted, while storing the data DATA_HOST in the data set DATA SET of the valid first cache set or the first cache set from which the data has been evicted.

In accordance with the present embodiments, the memory system may not only efficiently use the area of the cache memory between the host and the memory which have different data chunk sizes, but also prevent an evicting operation which is unnecessarily performed due to the difference in data chunk size.

Although various embodiments have been described for illustrative purposes, it will be apparent to those skilled in the art that various changes and modifications may be made without departing from the spirit and scope of the invention as defined in the following claims.

What is claimed is:

1. An operating method of a memory system which includes a cache memory including a plurality of first cache sets and a plurality of second cache sets, the operating method comprising:
    selecting one of the plurality of first cache sets and the plurality of second cache sets, based on an input address of a write request of the host, wherein the plurality of first caches sets is configured to store a data corresponding to even-bit address, and the plurality of second caches sets is configured to store a data corresponding to odd-bit address;
    storing an input data of the write request of the host in a third cache set of the plurality of first cache sets in response to a determination that the third cache set is selected and the input data corresponds to the even-bit address;
    generating location information of the third cache set in response to a determination that the third cache set is selected and the input data corresponds to the odd-bit address;
    storing the input data in a fourth cache set of the plurality of second cache sets, and storing the location information of the third cache set, as pair information, in the fourth cache set, in response to a determination that the fourth cache set is selected and the input data corresponds to the odd-bit address.

2. The operating method of claim 1, wherein data stored in the third cache set and the fourth cache set are evicted together, based on the pair information of the fourth cache set.

3. The operating method of claim 1, further comprising, in response to a determination that the plurality of first cache sets are not selected based on the input address and the input data corresponds to the even-bit address, allocating the input data to one of the plurality of first cache sets.

4. The operating method of claim 3, wherein the allocating of the input data to one of the plurality of first cache sets comprises:
    checking a valid first cache set among the plurality of first cache sets, based on valid information; and
    storing the input data in the valid first cache set.

5. The operating method of claim 4, wherein the allocating of the input data to one of the plurality of first cache sets further comprises, in response to a determination that there is no valid first cache set among the plurality of first cache sets, based on the check result:
    checking a first cache set, among the plurality of first cache sets, paired with a second cache set of the plurality of second cache sets, based on the pair information;
    evicting data of the first and second cache sets paired with each other together; and
    storing the input data in the first cache set from which the data has been evicted.

6. The operating method of claim 1, wherein the selecting one of the plurality of first cache sets and the plurality of second cache sets based on the input address comprises:
    comparing other lower bits other than a least significant bit (LSB), among lower bits of the input address, with indexes of the plurality of first cache sets and the plurality of second cache sets; and
    comparing the remaining bits of the input address with tags of cache sets having indexes indicated by the other lower bits, among the plurality of first cache sets and the plurality of second cache sets.

7. The operating method of claim 1, further comprising checking a least significant bit (LSB) of the input address.

8. The operating method of claim 7, wherein, according to whether the LSB of the input address corresponds to an even number or an odd number, the input data corresponds to the even-bit address or the odd-bit address.

* * * * *